(12) United States Patent
Yamaguchi et al.

(10) Patent No.: US 11,880,671 B2
(45) Date of Patent: Jan. 23, 2024

(54) CONTROL SYSTEM, MOVING OBJECT, SERVER, AND CONTROL METHOD FOR PERFORMING A PROGRAM UPDATE OF THE MOVING OBJECT

(71) Applicant: HONDA MOTOR CO., LTD., Tokyo (JP)

(72) Inventors: Kohei Yamaguchi, Tokyo (JP); Tomoaki Taki, Tokyo (JP); Yuki Kubo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 17/456,573

(22) Filed: Nov. 25, 2021

(65) Prior Publication Data

US 2022/0197626 A1    Jun. 23, 2022

(30) Foreign Application Priority Data

Dec. 22, 2020 (JP) ................................ 2020-213025

(51) Int. Cl.
*G06F 8/65* (2018.01)
*G05B 19/042* (2006.01)
(Continued)

(52) U.S. Cl.
CPC ........... *G06F 8/65* (2013.01); *B60W 50/0098* (2013.01); *B60W 50/14* (2013.01);
(Continued)

(58) Field of Classification Search
None
See application file for complete search history.

(56) References Cited

U.S. PATENT DOCUMENTS

2014/0325500 A1* 10/2014 Jang .......................... G06F 8/65
717/173
2019/0138296 A1* 5/2019 Ishikawa ............. G06F 11/1433
(Continued)

FOREIGN PATENT DOCUMENTS

CN      111031115 A    4/2020
JP      2004142511 A    5/2004
(Continued)

OTHER PUBLICATIONS

Office Action issued for counterpart Japanese Application No. 2020-213025, issued by the Japanese Patent Office dated Oct. 4, 2022 (drafted on Sep. 26, 2022).

*Primary Examiner* — Qing Chen (57) ABSTRACT

A control system includes: moving object control units; and an update control unit configured to control a program update of a moving object, in which the update control unit is configured to: perform, when the moving object is started, configuration synchronization for acquiring management information as information required to update the moving object control units and stored in the moving object control units, to acquire first management information and second management information, the first management information being acquired from a first moving object control unit that is one of the moving object control units, the second management information being stored in the update control unit; acquire, from a server, information regarding a presence or absence of an update program for each of the moving object control units when the first management information and the second management information match with each other.

21 Claims, 8 Drawing Sheets

| VIN | SN0 | SN1 | SN2 |
|---|---|---|---|
| 10000 | AAA | BBB | CCC |
| 10001 | DDD | EEE | FFF |
| . | . | . | . |
| x | . | . | x |
| . | . | . | . |

(51) Int. Cl.
*B60W 50/14* (2020.01)
*B60W 50/00* (2006.01)

(52) U.S. Cl.
CPC . *G05B 19/0426* (2013.01); *B60W 2050/0083* (2013.01); *B60W 2556/45* (2020.02); *G05B 2219/2637* (2013.01)

(56) References Cited

U.S. PATENT DOCUMENTS

| | | |
|---|---|---|
| 2019/0265966 A1 | 8/2019 | Shimomura |
| 2020/0233655 A1* | 7/2020 | Watanabe ........... G06F 11/0793 |
| 2020/0249930 A1 | 8/2020 | Abe |
| 2021/0155176 A1 | 5/2021 | Harata |
| 2021/0191661 A1 | 6/2021 | Harata |
| 2021/0397433 A1 | 12/2021 | Itatsu |
| 2022/0024471 A1 | 1/2022 | Itatsu |

FOREIGN PATENT DOCUMENTS

| | | |
|---|---|---|
| JP | 2011148398 A | 8/2011 |
| JP | 2017097851 A | 6/2017 |
| JP | 2018072920 A | 5/2018 |
| JP | 2020027622 A | 2/2020 |
| JP | 2020027666 A | 2/2020 |
| JP | 2020123253 A | 8/2020 |
| WO | 2020080321 A1 | 4/2020 |
| WO | 2020111090 A1 | 6/2020 |

* cited by examiner

| ECU | UNIT INFORMATION |
|---|---|
| ECU0 | UNIT INFORMATION |
| ECU1 | UNIT INFORMATION |
| ECU2 | UNIT INFORMATION |

*FIG. 4*

| VIN | SN0 | SN1 | SN2 |
|---|---|---|---|
| 10000 | AAA | BBB | CCC |
| 10001 | DDD | EEE | FFF |
| . . . | . . . | . . . | . . . |

CONTROL SYSTEM, MOVING OBJECT, SERVER, AND CONTROL METHOD FOR PERFORMING A PROGRAM UPDATE OF THE MOVING OBJECT

The contents of the following Japanese patent application are incorporated herein by reference:
Japanese Patent Application NO. 2020-213025 filed on Dec. 22, 2020.

BACKGROUND

1. Technical Field

The present invention relates to a control system, a moving object, a server, and a control method.

2. Related Art

Patent Document 1 discloses an ECU, as an ECU for a vehicle, which is capable of rewriting an application program.

CITATION LIST

Patent Document

Patent Document 1: Japanese Patent Application Publication No. 2020-27666

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
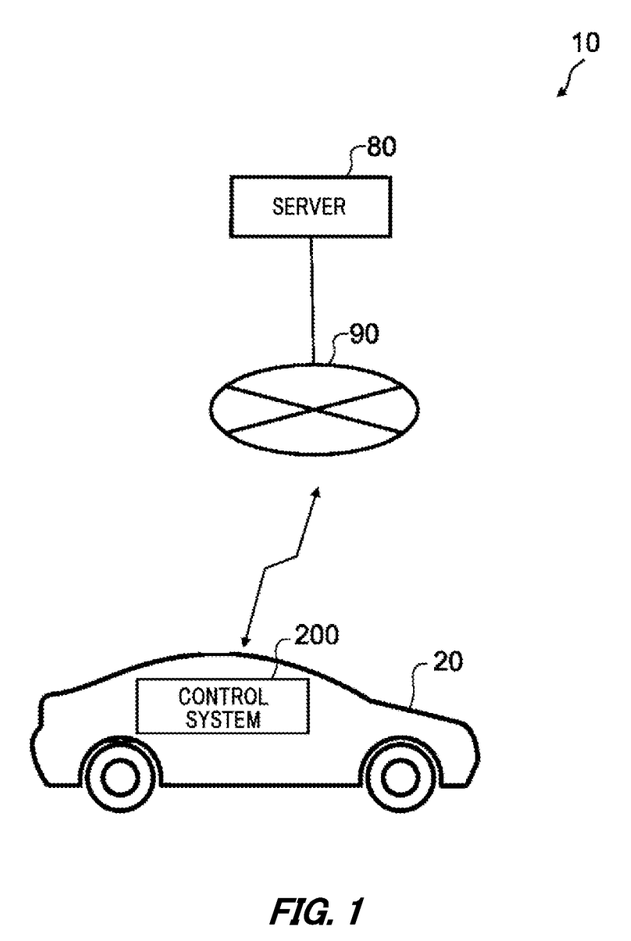
FIG. 1 schematically shows an update system 10 according to an embodiment.

FIG. 1 schematically shows an update system 10 according to an embodiment. The update system 10 includes a vehicle 20 and a server 80. The vehicle 20 includes a control system 200. The control system 200 is responsible for controlling the vehicle 20 and communicating with the server 80 through a communication network 90. The communication network 90 includes an IP network such as the Internet, a P2P network, a dedicated line including a VPN, a virtual network, a mobile communication network, and the like.

In the vehicle 20, the control system 200 includes a plurality of ECUs (Electronic Control Units) that control the vehicle 20. The control system 200 receives an update program for performing a program update of each ECU from the server 80 through the communication network 90 by a wireless communication. The control system 200 reprograms each ECU by the received update program. The reprogramming is performed for a purpose of upgrading a function or the like of each ECU included in the control system 200. In this way, the control system 200 updates the ECU by reprogramming the ECU through OTA (Over The Air).

Each ECU in the control system 200 stores specific management information assigned to each vehicle 20, and a serial number as identification information of each ECU. The server 80 manages the management information, and the identification information of each ECU in association with each other. In the present embodiment, the management information is represented by a "VIN". Further, in the present embodiment, the identification information of the ECU is set as the serial number. The identification information of the ECU is set to be represented by an "SN".

When IG (ignition) power of the vehicle 20 is turned on, the control system 200 respectively acquires VINs and serial numbers from ECUs, and transmits, to the server 80, configuration information including the VINs and the serial numbers. In a case where the VINs of the ECUs, which are respectively acquired when the IG power is turned on, match with each other, the control system 200 transmits, to the server 80, the configuration information including the VINs. The server 80 searches for information regarding a presence or absence of the update program for the vehicle 20 based on the configuration information received from the vehicle 20, and transmits the update program to the vehicle 20 when the update program exists. On the other hand, when the VINs of the ECUs do not match with each other, the control system 200 outputs an error and notifies a user of the vehicle 20 to set a valid VIN through a dealer or the like.

For example, in a case where the ECU was replaced during maintenance of the vehicle 20 in the past, the vehicle 20 may have been returned to the user without proper setting for VIN replacement. For example, in a case where the ECU mounted on the vehicle 20 is an ECU that was used in another vehicle in the past, the ECU may be in a state of being mounted on the vehicle 20 with the VIN of the other vehicle being written on the ECU. In such a case, the VIN is not correctly set, and thus the server 80 may not be able to provide an appropriate update program to the vehicle 20. In the meantime, the control system 200 checks the VIN when the IG power is turned on, and thus it is possible to suppress a distribution of an inappropriate update program.

Further, in a case where the ECU is replaced with a new one during the maintenance of the vehicle, an ECU in which an initial value is set for the VIN may be mounted on the vehicle 20. In a case where the VIN of a certain ECU has the initial value, when the IG power is turned on, the vehicle 20 requests the server 80 for the update program to update the VIN of the ECU. When a combination of the VIN and the serial number of another ECU is consistent with a combination managed by the server 80, the server 80 transmits, to the vehicle 20, the update program for matching the VIN having the initial value, with the VIN of the other ECU. On the other hand, when the combination of the VIN and the serial number of the other ECU is not consistent with the combination managed by the server 80, the server 80 outputs the error and notifies the user of the vehicle 20 to set the valid VIN through the dealer or the like.

In this way, even in a case where the ECU was replaced during the maintenance in the past and the VIN was not properly set, it is possible, with the update system 10, to enhance a possibility to enable an appropriate VIN to be set based on the configuration information managed by the server 80. Further, even in a case where a plurality of ECUs are replaced at the same time or the like such that the recoveries to correct the VINs are not possible, it is possible to detect an inappropriate state based on the consistency of the configuration information, and the notification to the user is possible without performing inappropriate OTA processing.

Figure 2:
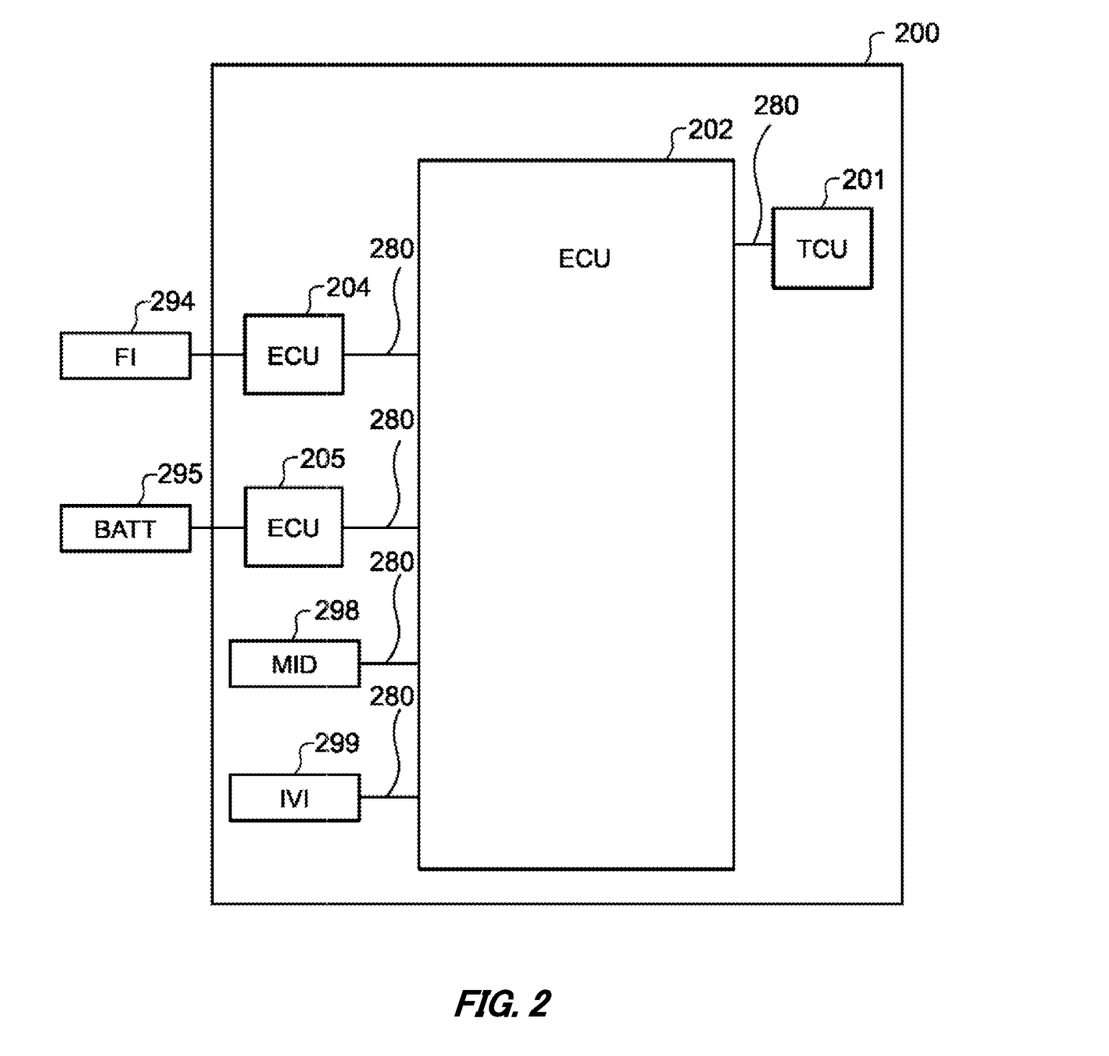
FIG. 2 schematically shows a system configuration of a control system 200.

FIG. 2 schematically shows a system configuration of a control system 200. The control system 200 includes a TCU 201, an ECU 202, an ECU 204, an ECU 205, a MID 298, and an IVI 299.

The ECU 202 is connected to the TCU 201, the ECU 204, and the ECU 205 through an in-vehicle communication line 280. The TCU 201, the ECU 204, and the ECU 205 communicate with each other through the in-vehicle communication line 280 and the ECU 202. The ECU 202 controls the TCU 201, the ECU 204, and the ECU 205 in an integrated manner. The in-vehicle communication line 280 may be configured to include, for example, a CAN (Controller Area Network), an ether network, or the like.

TCU201 is a telematics control unit (Telematics Control Unit). The TCU 201 is mainly responsible for a mobile communication. The TCU 201 transmits and receives data to and from the server 80 under the control of the ECU 202. TCU201 is an example of a communication unit.

The MID 298 and the IVI 299 are connected to the ECU 202 via the in-vehicle communication line 280. The MID 298 and the IVI 299 can function as display control units.

Each of the ECU 204 and the ECU 205 is a vehicle control unit that controls the vehicle 20. The ECU 204 and the ECU 205 are examples of a "moving object control unit". The ECU 204 and the ECU 205 control various devices included in the vehicle 20. For example, the ECU 204 controls an FI 294 that is a fuel injection device. The ECU 205 controls a BATT 295 that is a battery.

In the present embodiment, the system configuration in which the control system 200 includes the TCU 201, the ECU 202, the ECU 204, and the ECU 205 is illustrated, but the system configuration of the control system 200 is not limited to the example of the present embodiment. Further, in the present embodiment, examples of the ECU that can be a target of the program update are the ECU 202, the ECU 204, and the ECU 205, but the ECU that can be the target of the program update is not limited to these ECUs. Note that the ECU 202 functions as an update control unit that controls the program updates of the ECU 204 and the ECU 205 while the ECU 202 itself is the update target.

When the vehicle 20 is started, the ECU 202 performs configuration synchronization for acquiring the VINs as information required to update the ECU 204 and the ECU 205 and stored in the ECU 204 and ECU 205, to acquire a first VIN and a second VIN, the first VIN being acquired from a first ECU that is one of the ECU 204 and the ECU 205, the second VIN being stored in the ECU 202. The ECU 202 acquires, from the server 80, the information regarding the presence or absence of the update program for the ECU 204 and the ECU 205 when the first VIN and the second VIN match with each other, and stops the configuration synchronization when the first VIN and the second VIN do not match with each other. Note that the first VIN corresponds to a "VIN 1" or a "VIN 2" described below, and the second VIN corresponds to a "VIN 0" described below.

The ECU 202 controls the MID 298 and the IVI 299. The MID 298 and IVI 299 include display units that display information to the user of the vehicle 20. When the first VIN and the second VIN do not match with each other, the ECU 202 outputs error information to the IVI 299 to notify the user of the vehicle 20 of the error information. Note that the ECU 202 may output the error information to the IVI 299 when at least the first VIN has a predetermined initial value. The ECU 202 may output the error information to IVI 299 when the second VIN has a predetermined initial value and the first VIN does not have the initial value.

The ECU 202 transmits, to the server 80, a plurality of VINs acquired from the ECU 204 and the ECU 205, and when the second VIN has a predetermined initial value and a plurality of other VINs match with each other, the ECU 202 acquires, from the server 80, the update program for the ECU 202, which is for matching the second VIN with the plurality of other VINs.

Figure 3:
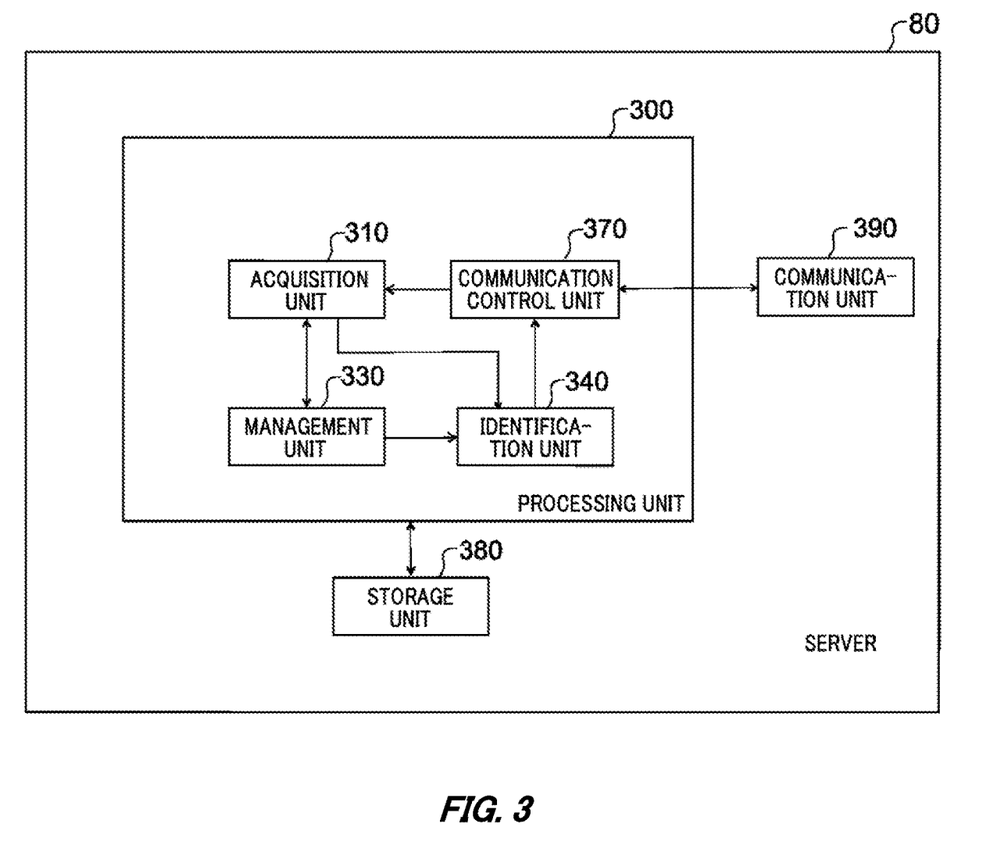
FIG. 3 shows a system configuration of a server 80.

FIG. 3 shows a system configuration of a server 80. The server 80 includes a communication unit 390, a storage unit 380, and a processing unit 300.

The processing unit 300 is, for example, realized by a processing device including a processor. The storage unit 380 is realized by including a non-volatile storage medium. The processing unit 300 performs processing by using the information stored in the storage unit 380. The communication unit 390 is responsible for communications with a plurality of vehicles including the vehicle 20.

The processing unit 300 includes an acquisition unit 310, a management unit 330, an identification unit 340, and a communication control unit 370. The communication control unit 370 controls the communication unit 390. The communication control unit 370 functions as a "transmission control unit".

The server 80 controls the program update of the vehicle 20 by transmitting, to the vehicle 20, the update program for performing the program update of the vehicle 20. The acquisition unit 310 acquires the VIN transmitted from the vehicle 20. The VIN is information required for updating the ECU 202, ECU 204, and ECU 205, and is an example of the management information stored in the ECU 202, ECU 204, and ECU 205. The communication control unit 370 controls a transmission unit that transmits, to the vehicle 20, the update program for at least one ECU of the ECU 204 and the ECU 205, which is the update target. The communication control unit 370 causes the update program to be transmitted to the vehicle 20 when the first VIN which is one of the plurality of VINs and the second VIN match with each other, and causes the error information to be transmitted when the first VIN and the second VIN do not match with each other. This makes it possible to suppress performing of the inappropriate program update.

The acquisition unit 310 further acquires the SN of each of the ECU 204, the ECU 205, and the ECU 202 transmitted from the vehicle 20. When the plurality of VINs and the second VIN match with each other, the management unit 330 manages the second VIN, and the identification information of each of the ECU 204, the ECU 205, and the ECU 202 in association with each other. In a case where the second VIN has a predetermined initial value, when the identification information of each of the ECU 204 and the ECU 205, the identification information being managed by the management unit 330 in association with the VIN matching the first VIN, and the identification information of each of the ECU 204 and the ECU 205, the identification information being acquired by the acquisition unit 310, are consistent with each other, the communication control unit 370 causes the update program for the ECU 202, which is for matching the second VIN with the plurality of VINs, to be transmitted to the vehicle 20.

When a VIN that does not match the other VIN exists among the plurality of VINs and the second VIN, the identification unit 340 compares the identification information of each of the ECU 204, the ECU 205, and the ECU 202, the identification information being managed by the management unit 330, with the identification information of each of the ECU 204, the ECU 205, and the ECU 202, the identification information being acquired by the acquisition unit 310, to identify, from among the plurality of VINs and the second VIN, one VIN to be stored in the ECU 204, the ECU 205, and the ECU 202. The communication control unit 370 causes the update program, which is for matching the VINs of the ECU 202, the ECU 204, and the ECU 205, with the VIN identified by the identification unit 340, to be transmitted to the vehicle 20. This makes it possible to enhance a possibility to enable the VIN to be recovered even when the appropriate VIN is not set in the ECU that is replaced during the maintenance of the vehicle 20.

Figure 4:
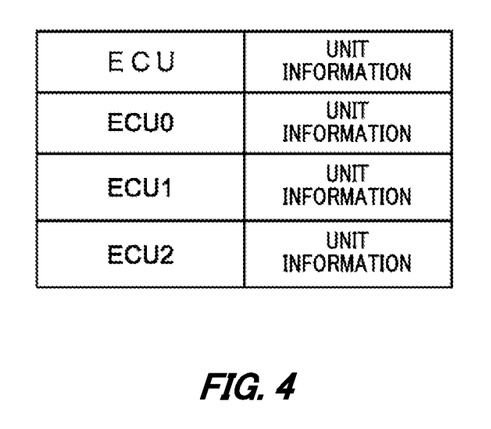
FIG. 4 shows an example of a data structure of configuration information stored in an ECU 202.

FIG. 4 shows an example of a data structure of configuration information stored in an ECU 202. The configuration information is stored in non-volatile memory included in the ECU 202. The configuration information includes the "ECU" and "unit information" as a data item. The "ECU" is information that identifies the ECU. An "ECU 0" in FIG. 4 represents an ECU 202 that manages the OTA processing. A symbol "ECU 1" represents the ECU 204 that controls the FI 294. An "ECU 2" represents the ECU 205 that controls the BATT 295. The "unit information" includes the SN, the VIN, version information of the control program, or the like of the corresponding ECU.

The ECU 202 acquires each of the unit information from the ECU 204 and the ECU 205 when the IG power is turned on. The ECU 202 stores the configuration information when the VINs, which are included in pieces of unit information respectively collected from the ECUs, match with each other. Thereby, the ECU 202 synchronizes the information stored in the ECU 202 with the information stored in each ECU.

Further, when the IG power is turned on, the ECU 202 transmits the configuration information including the unit information acquired from the ECU 204 and the ECU 205 and the unit information of the ECU 202 itself. The server 80 stores the configuration information received from the ECU 202. Thereby, the server 80 synchronizes the information stored in the server 80 with the information stored in the ECU 202.

Figure 5:
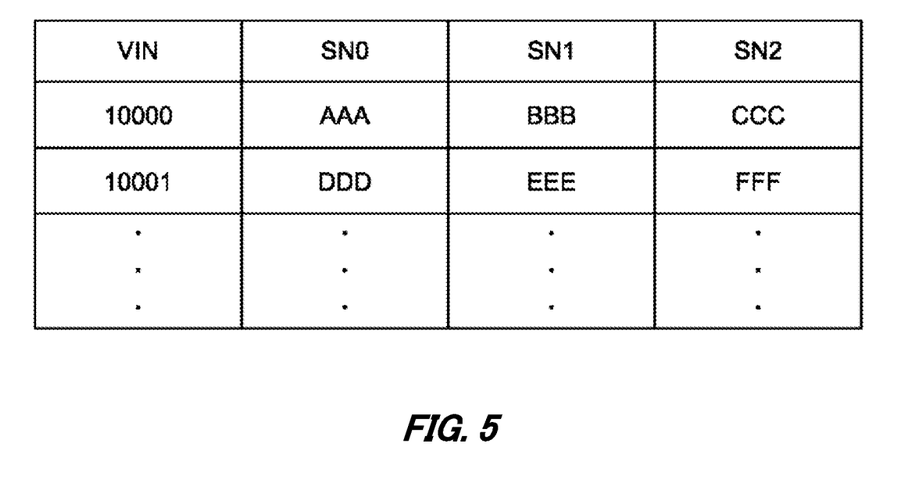
FIG. 5 shows an example of a data structure of ECU information managed by a management unit 330 of the server 80.

FIG. 5 shows an example of a data structure of ECU information managed by a management unit 330 of the server 80. The ECU information is stored in the storage unit 380. The configuration information includes the "VIN" and an "SN 0", an "SN 1", and an "SN 2" as a data item.

The "VIN" is a VIN included in the configuration information received from one vehicle. The "SN 0", the "SN 1" and the "SN 2" are serial numbers SNs included in the configuration information. In FIG. 5, the "SN 0" represents the ECU (the ECU 202 in the vehicle 20) that manages the OTA processing. The "SN 1" represents the ECU (for example, the ECU 204 in the vehicle 20) that controls the fuel injection device, and the "SN 2" represents the ECU (for example, the ECU 205 in the vehicle 20) that controls the battery.

As shown in FIG. 5, when the acquisition unit 310 respectively acquires the SNs of the ECUs included in the configuration information, the management unit 330 associates the VIN with the SN of each ECU to manage the ECU information on condition that the VINs, which are included in the configuration information acquired by the acquisition unit 310, match with each other. This makes it possible for the server 80 to perform the management regarding what serial number the ECU has, the ECU being provided in the vehicle identified by the VIN.

As an example, it is assumed that the ECU 202 is delivered to the user with the SN having the initial value as is when the ECU 202 is replaced with a new one during the maintenance of the vehicle 20. Note that it is assumed that the initial value is stored as the VIN in the new ECU 202 and the SN of the new ECU 202 is "XXX". Further, it is assumed that "10000" is stored as the VIN in the ECU 204 and the ECU 205. It is assumed that the SN of the ECU 204 is "BBB" and the SN of the ECU 205 is "CCC".

When the IG power of the vehicle 20 is turned on, in a case where the identification unit 340 of the server 80 determines that the VIN of the ECU 202 has the initial value from the configuration information received from the vehicle 20, the identification unit 340 identifies the "BBB" and the "CCC" as the SNs associated with "10000" which is the VIN of the other ECU 204 and ECU 205 in the configuration information. The identification unit 340 determines that the combination of "10000" and "BBB", and the combination of "10000" and "CCC" in the configuration information of the ECU 204 and the ECU 205 received from the vehicle 20 are consistent with the configuration information managed by the management unit 330. In this case, the identification unit 340 determines that the ECU 202 has been replaced. The communication control unit 370 transmits, to the vehicle 20, the update program for changing the VIN of the ECU 202 to "10000". Further, the management unit 330 changes the SN 0 associated with the VIN "10000" to "XXX". This makes it possible to recover the information of the server 80 and the information of the ECU 202 even when the ECU 202 is replaced with a new one and the VIN is not correctly set.

Figure 6:
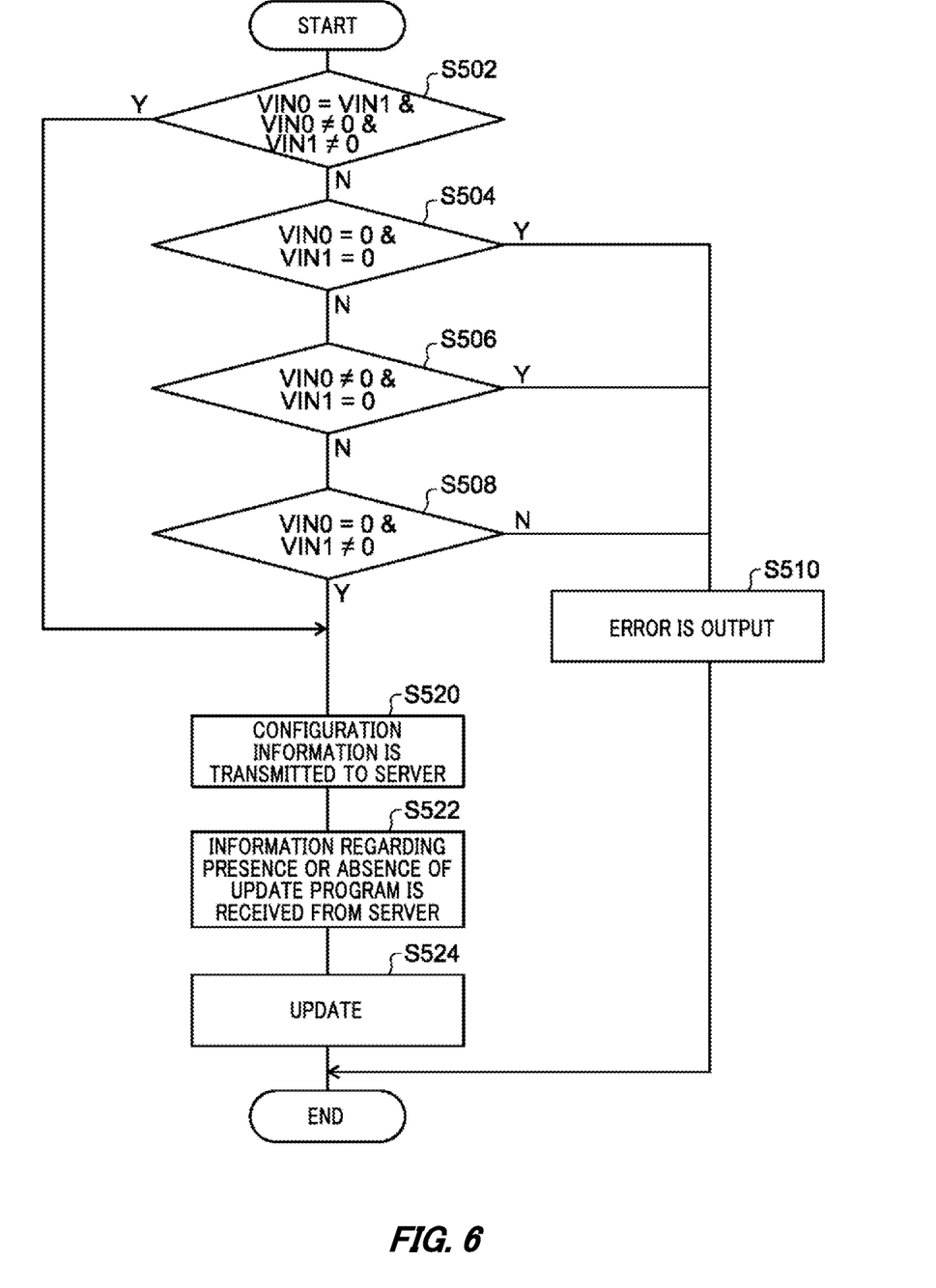
FIG. 6 is a flowchart showing a processing procedure relating to a control method executed by the control system 200.

FIG. 6 is a flowchart showing a processing procedure relating to a control method executed by the control system 200. The processing of this flowchart is started when the IG power of the vehicle 20 is turned on. Note that in this flowchart, the initial value of the VIN is assumed to be "0".

In S502, the ECU 202 determines whether a condition 1 that "the VIN 0 matches the VIN 1, and neither the VIN 0 nor the VIN 1 has the initial value" is satisfied. When the condition 1 is satisfied, the configuration information is transmitted to the server 80 in S520, the information regarding the presence or absence of the update program is received from the server 80 in S522, and the ECU is updated in S524 when the update program exists.

When it is determined in S502 that the condition 1 is not satisfied, the ECU 202 determines in S504 whether a condition 2 that "both of the VIN 0 and the VIN 1 have the initial values" is satisfied. When the condition 2 is satisfied, the ECU 202 outputs the error including an error code in S510, and the ECU 202 displays warning information to the user on the displays of the MID 298 and the IVI 299. For example, the user is warned to have the vehicle maintenance be performed at the dealer.

When it is determined in S504 that the condition 2 is not satisfied, the ECU 202 determines in S506 whether a condition 3 that "the VIN 0 does not have the initial value, and the VIN 1 has the initial value" is satisfied. When the condition 3 is satisfied, the ECU 202 outputs the error including the error code in S510, and the ECU 202 causes the warning information to the user to be displayed on the displays of the MID 298 and the IVI 299.

When it is determined in S506 that the condition 3 is not satisfied, the ECU 202 determines in S508 whether a condition 4 that "the VIN 0 has the initial value, and the VIN 1 does not have the initial value" is satisfied. When the condition 4 is not satisfied, the ECU 202 outputs the error including the error code in S510, and the ECU 202 causes the warning information to the user to be displayed on the MID 298 and the IVI 299. Note that a case where the condition 4 is not satisfied in S508 corresponds to a case where the VIN 0 does not match the VIN 1 and both of the VIN 0 and the VIN 1 do not have the initial values.

When the condition 4 is satisfied in S508, processing proceeds to S520 and the processing subsequent to S520 is performed. In this case, as described in relation to FIG. 5 or the like, the update program for recovering the VIN of the ECU 202 can be received from the server 80.

Figure 7:
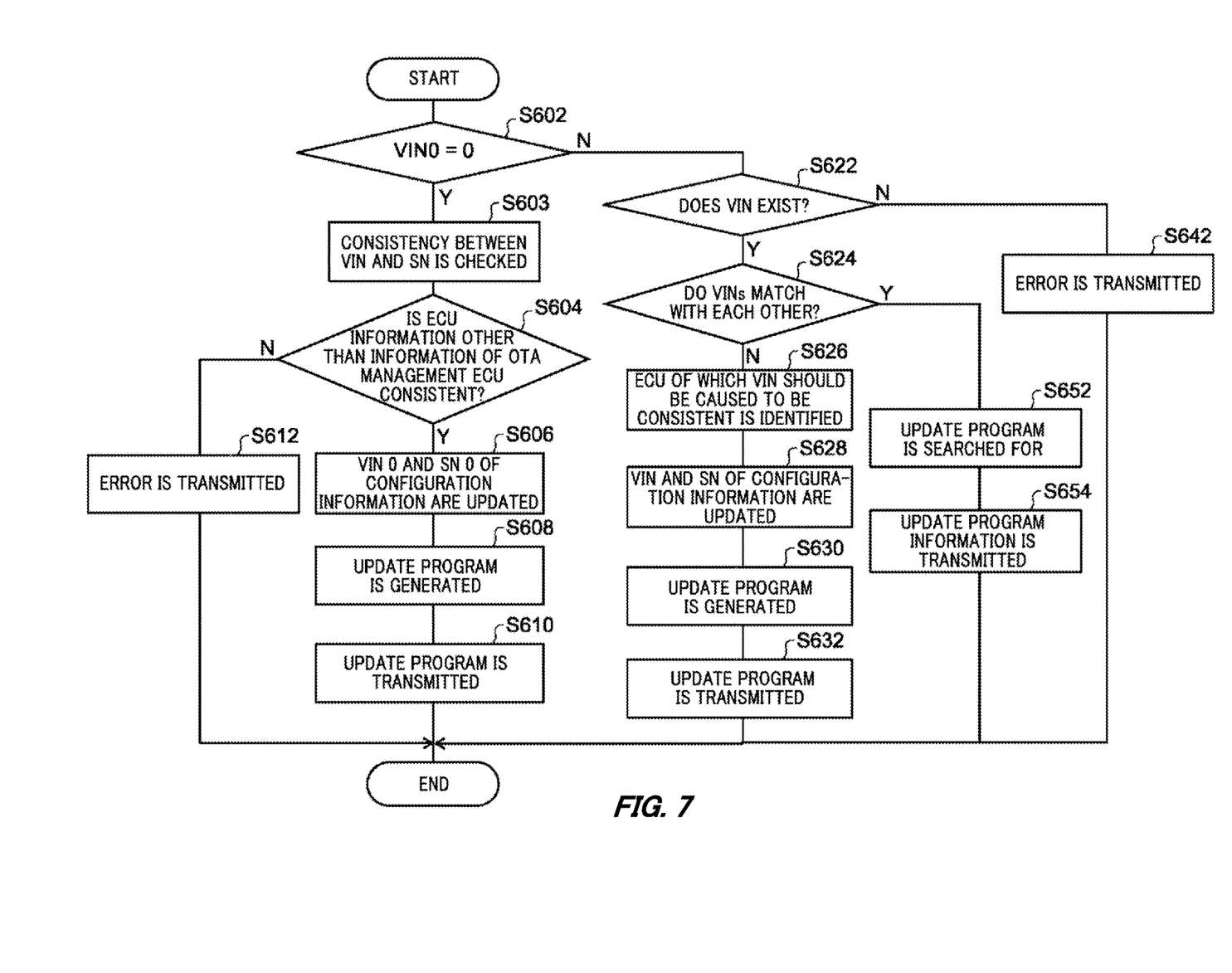
FIG. 7 is a flowchart showing a processing procedure relating to an update control method executed by the server 80.

FIG. 7 is a flowchart showing a processing procedure relating to an update control method executed by the server 80. The processing of this flowchart is started when the configuration information is acquired from the control system 200.

In S602, the identification unit 340 determines whether the VIN 0 has the initial value. When the VIN 0 has the initial value, the identification unit 340 checks the consistency between the VIN and the SN in S603. Specifically, as described in relation to FIG. 5, the identification unit 340 checks whether the VINs of the ECUs other than the ECU 202 match with each other in the configuration information received from the vehicle 20 (a condition A), and whether the combinations of the VINs and the SNs of all the ECUs other than the ECU 202 are consistent with the configuration information managed by the management unit 330 (a condition B). In S604, the identification unit 340 determines whether the configuration information other than the configuration information of the ECU 202 is consistent with the configuration information managed by the management unit 330. Specifically, the identification unit 340 determines that there is the consistency when the condition A and the condition B are satisfied, and determines that there is no consistency when at least one of the condition A and the condition B is not satisfied.

When it is determined in S604 that there is no consistency, the communication control unit 370 controls the communication unit 390 to transmit the error information to the vehicle 20 in S612. In the vehicle 20, the ECU 202 outputs the error including the corresponding error code, and the ECU 202 causes the warning information to the user to be displayed on the displays of the MID 298 and the IVI 299.

When it is determined in S604 that there is the consistency, the management unit 330 updates the VIN 0 and the SN 0 of the configuration information managed by the management unit 330, in S606. In S608, the identification unit 340 generates update program data including the update program for matching the VIN of the ECU 202 with the VINs of the other ECUs. Note that the update program data may include the update program for the ECU other than the ECU 202. Subsequently, in S610, the communication control unit 370 controls the communication unit 390 to transmit the update program data to the vehicle 20, and ends the processing of this flowchart.

When it is determined in S602 that the VIN 0 does not have the initial value, it is determined in S622 whether information corresponding to the VIN 0 exists in the configuration information managed by the management unit 330. When the information corresponding to the VIN 0 does not exist, the communication control unit 370 controls the communication unit 390 to transmit the error information to the vehicle 20 in S642. In the vehicle 20, the ECU 202 outputs the error including the corresponding error code, and the ECU 202 causes the warning information to the user to be displayed on the displays of the MID 298 and the IVI 299. This makes it possible to suppress a use of the ECU in which an inappropriate VIN that is not managed by the management unit 330 is set.

When the information corresponding to the VIN 0 exists, the identification unit 340 determines in S624 whether the VINs, which are included in the configuration information received from the vehicle 20, match with each other. When the VINs match with each other, the identification unit 340 searches for the update program associated with the VIN as the update program for the vehicle 20, in S652. In S654, the communication control unit 370 controls the communication unit 390 to transmit update program information to the vehicle 20, and ends the processing of this flowchart. Note that the update program information transmitted in S654 includes information indicating the presence or absence of the update program. Further, when the update program is searched for in S652, the update program information includes the update program data.

When it is determined in S624 that the VINs do not match with each other, the identification unit 340 identifies the ECU of which the VIN should be caused to be consistent, by referring to the configuration information managed by the management unit 330, in S626. As an example, in a case where only the VIN 2 of the ECU 205 does not match with the other VINs, the identification unit 340 acquires the SN associated with the VIN other than the VIN 2 from the configuration information managed by the management unit 330, and when the acquired SN matches the SN other than the SN of the ECU 205 in the configuration information received from the vehicle 20, the identification unit 340 identifies the ECU 205 as the ECU of which the VIN should be caused to be consistent. This makes it possible to determine that the VIN of the ECU 205 should be caused to be consistent, for example, when the ECU 205 is replaced and the VIN of the ECU 205 is not correctly set.

In S628, the management unit 330 updates the VIN and SN of the configuration information managed by the management unit 330. For example, the management unit 330 sets the VIN and the SN of the configuration information received from the vehicle 20, for the VIN and the SN of the ECU 205 which are managed by the management unit 330. In S630, the identification unit 340 generates the update program data including the update program for matching the VIN of the ECU. In the above-described example, the update program for matching the VIN of the ECU 205 with the VINs of the other ECUs is generated. The update program data may include the update program for the ECU other than the ECU 205. Subsequently, in S632, the communication control unit 370 controls the communication unit 390 to transmit the update program data to the vehicle 20, and ends the processing of this flowchart.

With the embodiment described above, it is possible to reduce the possibility of performing the inappropriate program update, for example, in a case where the ECU was replaced during maintenance of the vehicle 20 in the past, and the VIN is not properly set. It is also possible to warn the user to have the maintenance of the ECU be performed. Further, when the inconsistency of the VIN is detected, it is possible to enable the appropriate recovery of the VIN without going to the dealer or the like by the server 80 managing the VIN and the SN.

Figure 8:
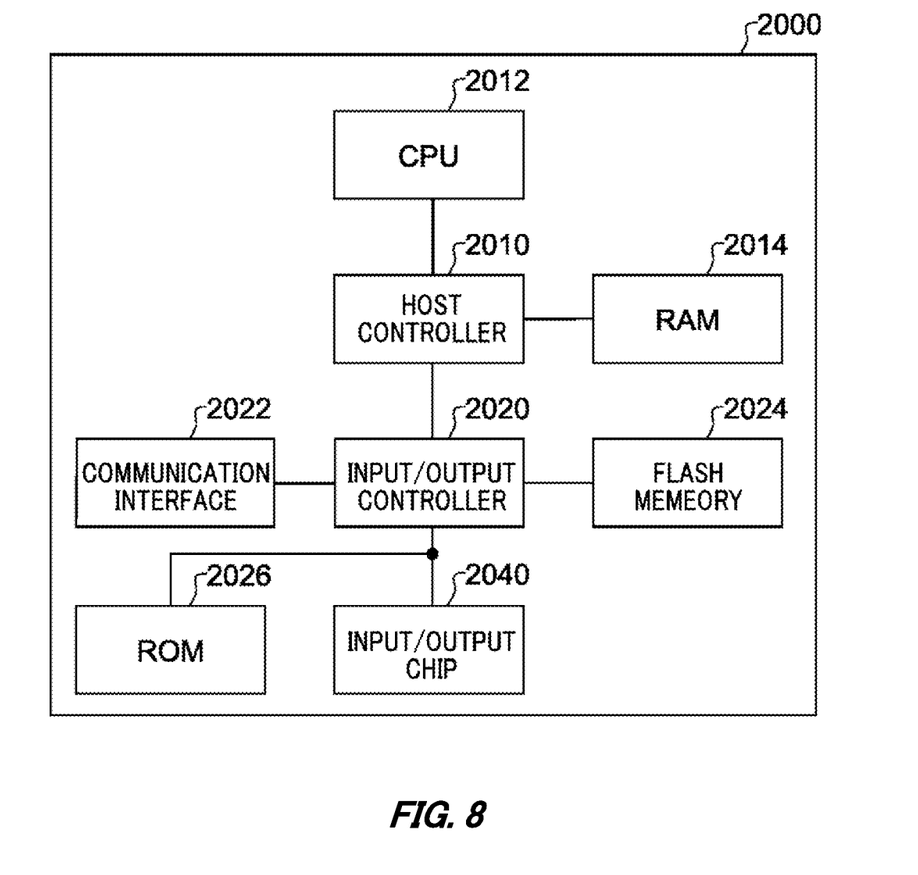
FIG. 8 shows an example of a computer 2000.

FIG. 8 shows an example of a computer 2000 in which a plurality of embodiments of the present invention may be entirely or partially embodied. A program installed on the computer 2000 can cause the computer 2000 to function as a system such as the control system, the server or the device or the system, or each unit of the server or the device according to the embodiment, or to execute an operation associated with each unit, and/or to execute a process or steps of the process according to the embodiment. Such a program may be executed by a CPU 2012 to cause the computer 2000 to execute the specific operation associated with some or all of the blocks of the processing procedure and the block diagram described in the present specification.

The computer 2000 according to the present embodiment includes the CPU 2012, and a RAM 2014, which are interconnected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. A device or a method may be configured by realizing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and perform various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored on the computer 2000 or in a computer-readable storage medium near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program, which is installed on the computer 2000 and causes the computer 2000 to function as the control system 200, may work on the CPU 2012 or the like to cause the computer 2000 to function as each unit of the control system 200. Information processing written in these programs functions as each unit of the control system 200 that is specific means by which software and the above-described various hardware resources cooperate by being read by the computer 2000. Then, by the specific means realizing calculation or processing of information according to a purpose of use of the computer 2000 in the present embodiment, the unique control system 200 according to the purpose of use is constructed.

A program, which is installed on the computer 2000 and causes the computer 2000 to function as the server 80, may work on the CPU 2012 or the like to cause the computer 2000 to function as each unit of the server 80. Information processing written in these programs functions as each unit of the control system 200 that is specific means by which software and the above-described various hardware resources cooperate by being read by the computer 2000. Then, by the specific means realizing calculation or processing of information according to a purpose of use of the computer 2000 in the present embodiment, the unique server 80 according to the purpose of use is constructed.

Various embodiments have been described with reference to the block diagrams or the like. Blocks in the block diagrams may respectively represent (1) steps of processes in which operations are executed or (2) "units" of apparatuses responsible for executing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

Computer-readable storage media may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of computer-readable storage media may include an electronic storage medium, a magnetic storage medium, an optical storage medium, an electromagnetic storage medium, a semiconductor storage medium, etc. Specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions is executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 update system; 20 vehicle; 80 server; 90 communication network; 200 control system; 201 TCU; 202 ECU; 204 ECU; 205 ECU; 280 in-vehicle communication line; 294 FI; 295 BATT; 298 MID; 299 WI; 300 processing unit; 310 acquisition unit; 330 management unit; 340 identification unit; 370 communication control unit 380 storage unit; 390 communication unit; 2000 computer; 2010 host controller; 2012 CPU; 2014 RAM; 2020 input/output controller; 2022 communication interface; 2024 flash memory; 2026 ROM; 2040 input/output chip

What is claimed is:

1. A control system comprising:
    a plurality of moving object control units configured to control a moving object; and
    an update control unit configured to control a program update of the moving object, wherein:
    the update control unit is further configured to:
        perform, when the moving object is started, configuration synchronization for acquiring management information as information required to update the plurality of moving object control units and stored in the plurality of moving object control units, to acquire first management information and second management information, wherein the first management information is acquired from a first moving object control unit that is one of the plurality of moving object control units, and wherein the second management information is stored in the update control unit,
        acquire, from a server, information regarding a presence or absence of an update program for each of the plurality of moving object control units when the first management information and the second management information match with each other, and
        stop the configuration synchronization for acquiring the management information as the information required to update the plurality of moving object control units when the first management information and the second management information do not match with each other.

2. The control system according to claim 1, further comprising:
    a display control unit configured to control a display unit that is configured to display information to a user of the moving object, wherein:
    the update control unit is further configured to output error information to the display control unit when the first management information and the second management information do not match with each other.

3. The control system according to claim 2, wherein:
    the update control unit is further configured to output the error information to the display control unit when at least the first management information has a predetermined initial value.

4. The control system according to claim 3, wherein:
    the update control unit is further configured to output the error information to the display control unit when the second management information has a predetermined initial value and the first management information does not have the predetermined initial value.

5. The control system according to claim 2, wherein:
the update control unit is further configured to output the error information to the display control unit when the second management information has a predetermined initial value and the first management information does not have the predetermined initial value.

6. The control system according to claim 1, further comprising:
a display control unit configured to control a display unit that is configured to display information to a user of the moving object, wherein:
the update control unit is further configured to output error information to the display control unit when at least the first management information has a predetermined initial value.

7. The control system according to claim 6, wherein:
the update control unit is further configured to output the error information to the display control unit when the second management information has a predetermined initial value and the first management information does not have the predetermined initial value.

8. The control system according to claim 1, further comprising:
a display control unit configured to control a display unit that is configured to display information to a user of the moving object, wherein:
the update control unit is further configured to output error information to the display control unit when the second management information has a predetermined initial value and the first management information does not have the predetermined initial value.

9. The control system according to claim 1, wherein:
the update control unit is further configured to:
cause a plurality of pieces of management information, which are acquired from the plurality of moving object control units, to be transmitted to the server, and
acquire, from the server, an update program for the update control unit, which is for matching the second management information with the plurality of pieces of management information when the second management information has a predetermined initial value, and the plurality of pieces of management information match with each other.

10. The control system according to claim 1, wherein:
the moving object is a vehicle.

11. The control system according to claim 1, wherein:
the plurality of moving object control units are ECUs (Electronic Control Units).

12. The control system according to claim 11, wherein:
the update control unit is further configured to update the ECUs through OTA (Over The Air).

13. A moving object comprising the control system according to claim 1.

14. The moving object according to claim 13, wherein:
the moving object is a vehicle.

15. A server configured to transmit, to a moving object, an update program for performing a program update of the moving object, in which the moving object includes a plurality of moving object control units configured to control the moving object, and an update control unit is configured to control the program update of the moving object, the server comprising:
an acquisition unit configured to acquire a plurality of pieces of management information as information required to update the plurality of moving object control units and stored in the plurality of moving object control units and second management information that is one of the plurality of pieces of management information stored in the update control unit, which are all transmitted from the moving object; and
a transmission control unit configured to control a transmission unit that is configured to transmit, to the moving object, an update program for at least one moving object control unit of the plurality of moving object control units, wherein:
the transmission control unit is further configured to:
cause the update program for the at least one moving object control unit of the plurality of moving object control units to be transmitted to the moving object when first management information that is one of the plurality of pieces of management information and the second management information match with each other, and
cause error information to be transmitted to the moving object when the first management information and the second management information do not match with each other.

16. The server according to claim 15, wherein:
the acquisition unit is further configured to further acquire identification information of each of the plurality of moving object control units and the update control unit, wherein the identification information of each of the plurality of moving object control units and the update control unit is transmitted from the moving object,
the server further comprising:
a management unit configured to manage the second management information, and the identification information of each of the plurality of moving object control units and the update control unit in association with each other, when the plurality of pieces of management information and the second management information match with each other, wherein:
in a case where the second management information has a predetermined initial value, the identification information of each of the plurality of moving object control units and the update control unit is managed by the management unit in association with management information matching the first management information, and the identification information of each of the plurality of moving object control units, the identification information is acquired by the acquisition unit, are consistent with each other, the transmission control unit causes an update program for the update control unit, which is for matching the second management information with the plurality of pieces of management information, to be transmitted to the moving object.

17. The server according to claim 15, wherein:
the acquisition unit is further configured to further acquire identification information of each of the plurality of moving object control units and the update control unit, wherein the identification information of each of the plurality of moving object control units and the update control unit is transmitted from the moving object,
the server further comprising:
a management unit configured to manage the second management information, and the identification information of each of the plurality of moving object control units and the update control unit in association with each other, when the plurality of pieces of management information and the second management information match with each other; and an identification unit configured to compare the identification information of each of the plurality of moving object control units and the update control unit, the identification information of each of the plurality of moving object control units and the update control unit is managed by the management unit, with the identification information of each of the plurality of moving object control units and the update control unit, the identification information of each of the plurality of moving object control units and the update control unit is acquired by the acquisition unit, to identify, from among the plurality of pieces of management information and the second management information, one management information to be stored in the plurality of moving object control units and the update control unit, when management information that does not match other management information exists among the plurality of pieces of management information and the second management information, wherein:

the transmission control unit causes the update program, which is for matching the plurality of pieces of management information and the update control unit, with the one management information identified by the identification unit, to be transmitted to the moving object.

18. A control method comprising:

performing, when a moving object is started, configuration synchronization for acquiring management information as information required to update a plurality of moving object control units configured to control the moving object and stored in the plurality of moving object control units, to acquire first management information and second management information, wherein the first management information is acquired from a first moving object control unit that is one of the plurality of moving object control units, and wherein the second management information is stored in an update control unit configured to control a program update of the moving object, acquiring, from a server, information regarding a presence or absence of an update program for each of the plurality of moving object control units when the first management information and the second management information match with each other, and stopping the configuration synchronization for acquiring the management information as the information required to update the plurality of moving object control units when the first management information and the second management information do not match with each other.

19. A program stored on a non-transitory computer-readable storage medium, when executed by a computer, causing the computer to function as:

a plurality of moving object control units configured to control a moving object; and an update control unit configured to control a program update of the moving object, wherein:

due to the program, the update control unit is further configured to:

perform, when the moving object is started, configuration synchronization for acquiring management information as information required to update the plurality of moving object control units and stored in the plurality of moving object control units, to acquire first management information and second management information, wherein the first management information is acquired from a first moving object control unit that is one of the plurality of moving object control units, and wherein the second management information is stored in the update control unit, acquire, from a server, information regarding a presence or absence of an update program for each of the plurality of moving object control units when the first management information and the second management information match with each other, and stop the configuration synchronization for acquiring the management information as the information required to update the plurality of moving object control units when the first management information and the second management information do not match with each other.

20. A control method for updating a program of a moving object, wherein:

the moving object includes a plurality of moving object control units configured to control the moving object, and an update control unit is configured to control a program update of the moving object, the control method for updating the program of the moving object comprising:

acquiring a plurality of pieces of management information stored by the plurality of moving object control units and second management information stored by the update control unit, which are transmitted from the moving object and are necessary for updating the plurality of moving object control units;

causing an update program of at least one of the plurality of moving object control units to be transmitted to the moving object when first management information, which is one of the plurality of pieces of management information, matches the second management information; and causing error information to be transmitted when the first management information and the second management information do not match.

21. A program stored on a non-transitory computer-readable storage medium configured to cause a computer to function as a server for transmitting an update program to a moving object for updating a program of the moving object, wherein:

the moving object includes a plurality of moving object control units configured to control the moving object, and an update control unit is configured to control a program update of the moving object, the program causing the computer to further function as:

an acquisition unit configured to acquire a plurality of pieces of management information transmitted from the moving object and stored by the plurality of moving object control units and second management information stored by the update control unit, which is information necessary for updating the plurality of moving object control units; and a transmission control unit configured to control a transmission unit that is configured to transmit the update program of at least one of the plurality of moving object control units to the moving object, wherein due to the program, the transmission control unit:

causes the transmission of the update program of the at least one of the plurality of moving object control units to the moving object when first management information, which is one of the plurality of pieces of management information, matches the second management information, and causes error information to be transmitted when the first management information and the second management information do not match.

* * * * *